(12) United States Patent
Miyase et al.

(10) Patent No.: US 12,022,041 B2
(45) Date of Patent: Jun. 25, 2024

(54) IMAGE RECORDING APPARATUS AND FEED TRAY (71) Applicant: BROTHER KOGYO KABUSHIKI KAISHA, Nagoya (JP)

(72) Inventors: Satoshi Miyase, Gamagori (JP); Kengo Noda, Inazawa (JP); Hideaki Yoshimune, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/173,118

(22) Filed: Feb. 23, 2023

(65) Prior Publication Data
US 2023/0276009 A1     Aug. 31, 2023

(30) Foreign Application Priority Data

Feb. 25, 2022   (JP) ................................ 2022-027546

(51) Int. Cl.
*H04N 1/032* (2006.01)
*H04N 1/00* (2006.01)
*H04N 1/08* (2006.01)

(52) U.S. Cl.
CPC ......... *H04N 1/032* (2013.01); *H04N 1/00408* (2013.01); *H04N 1/00519* (2013.01);
(Continued)

(58) Field of Classification Search
CPC ...... H04N 1/032; H04N 1/00408; H04N 1/00; H04N 1/00519; H04N 1/00602; H04N 1/00623; H04N 1/00647; H04N 1/00567; H04N 1/0826; H04N 1/00676; H04N 1/2307; H04N 1/233; H04N 1/33315; B65H 3/44; G03G 15/652; G03G 2215/00383; G03G 2215/00421; G03G 2215/00447; G03G 2215/00451; G03G 2215/00556; G03G 2215/00814; G03G 2215/00928; A61B 2576/00; A61B 2576/02;
(Continued)

(56) References Cited

U.S. PATENT DOCUMENTS

| 5,072,306 A | 12/1991 | Matsumoto et al. |
| 7,435,023 B2 * | 10/2008 | Sasaki ........................ B41J 3/46 400/607.2 |

(Continued)

FOREIGN PATENT DOCUMENTS

| JP | 2-264556 A | 10/1990 |
| JP | 8-169580 A | 7/1996 |

*Primary Examiner* — Negussie Worku
(74) *Attorney, Agent, or Firm* — Merchant & Gould P.C.

(57) ABSTRACT

An image recording apparatus includes a feed tray configured to accommodate a sheet-shaped medium, the sheet-shaped medium including at least one of a first sheet-shaped medium or a second sheet-shaped medium, and a recording device configured to record an image on the sheet-shaped medium fed from the feed tray. The feed tray includes a first accommodation portion configured to accommodate a roll, in which the first sheet-shaped medium is rolled in a roll shape, a second accommodation portion configured to accommodate a plurality of the second sheet-shaped media in a stacked state, and a display portion that displays setting information on setting of the sheet-shaped medium.

20 Claims, 8 Drawing Sheets

(52) U.S. Cl.
CPC ..... *H04N 1/00602* (2013.01); *H04N 1/00623* (2013.01); *H04N 1/00647* (2013.01); *H04N 1/0826* (2013.01)

(58) Field of Classification Search
CPC ... A61B 5/0095; A61B 5/7203; A61B 5/0033; A61B 8/44; A61B 8/48; A61B 8/481; A61B 8/52; A61B 8/5215; G16H 30/40
USPC .......................................................... 358/1.1
See application file for complete search history.

(56) References Cited

U.S. PATENT DOCUMENTS

| | | | |
|---|---|---|---|
| 2009/0237477 A1* | 9/2009 | Kumagai | G03G 21/1647 347/101 |
| 2010/0310294 A1* | 12/2010 | Tsugaru | B65H 26/08 400/583 |
| 2010/0321460 A1* | 12/2010 | Yoshimura | B41J 2/325 347/215 |
| 2017/0235256 A1* | 8/2017 | Mori | G03G 15/1665 399/66 |
| 2018/0272748 A1* | 9/2018 | Hasegawa | B41J 2/3558 |
| 2021/0300706 A1* | 9/2021 | Tsujimura | B65H 35/006 |
| 2021/0329139 A1* | 10/2021 | Hiramatsu | H04N 1/00615 |
| 2022/0234852 A1* | 7/2022 | Miyase | B65H 35/06 |
| 2023/0171353 A1* | 6/2023 | Kasamatsu | H04N 1/00 358/1.15 |
| 2023/0202217 A1* | 6/2023 | Ohhashi | B41J 13/0018 347/101 |
| 2023/0286296 A1* | 9/2023 | Yamaguchi | B41J 11/663 |
| 2023/0286771 A1* | 9/2023 | Yamaguchi | B65H 35/0066 |

\* cited by examiner

IMAGE RECORDING APPARATUS AND FEED TRAY

REFERENCE TO RELATED APPLICATIONS

This application claims priority from Japanese Patent Application No. 2022-027546 filed on Feb. 25, 2022. The entire content of the priority application is incorporated herein by reference.

BACKGROUND ART

A related-art facsimile has a sheet feeding cassette which can accommodate a roll paper and cut papers.

DESCRIPTION

Until now, in the paper feeding cassette which can accommodate two types of paper, roll paper and cut paper, as described above, a user has not been notified of information on setting of the paper. Therefore, there is a possibility that a setting work of the paper by the user may not be performed smoothly.

Illustrative aspects of the present disclosure provide an image recording apparatus and a feed tray that allow a user to smoothly set a sheet-shaped medium.

According to one illustrative aspect of the present disclosure, an image recording apparatus includes: a feed tray configured to accommodate a sheet-shaped medium, the sheet-shaped medium including at least one of a first sheet-shaped medium or a second sheet-shaped medium; and a recording device configured to record an image on the sheet-shaped medium fed from the feed tray. The feed tray includes: a first accommodation portion configured to accommodate a roll, in which the first sheet-shaped medium is rolled in a roll shape; a second accommodation portion configured to accommodate a plurality of the second sheet-shaped media in a stacked state; and a display portion that displays setting information on setting of the sheet-shaped medium.

According to another illustrative aspect of the present disclosure, a feed tray configured to accommodate a sheet-shaped medium, the sheet-shaped medium including at least one of a first sheet-shaped medium or a second sheet-shaped medium, the feed tray includes: a first accommodation portion configured to accommodate a roll, in which the first sheet-shaped medium is rolled in a roll shape; a second accommodation portion configured to accommodate a plurality of the second sheet-shaped media in a stacked state; and a display portion that displays setting information on setting of the sheet-shaped medium.

According to the image recording apparatus and feed tray of the present disclosure, since the feed tray including the first accommodation portion and the second accommodation portion has the display portion for displaying the setting information on the setting of the sheet-shaped medium, the user can smoothly perform the setting work of the sheet-shaped medium.

FIGS. 3A and 3B are cross-sectional views taken along the line of a second accommodation portion in the feed tray illustrated in FIG. 2, where FIG. 3A illustrates a state in which a flap is in a first position and FIG. 3B illustrates a state in which the flap is in a second position.

FIGS. 8A and 8B are views illustrating displays on a support plate and the flap, where FIG. 8A illustrates a state in which the flap is in the first position and FIG. 8B illustrates a state in which the flap is in the second position.

A printer 100 (which is one example of an image recording apparatus) according to an illustrative embodiment of the present disclosure will be described below with reference to FIG. 1. An up-down direction, a front-rear direction, and a left-right direction are defined as an up-down direction, a front-rear direction, and a left-right direction of a printer 100. Both the front-rear direction and the left-right direction are substantially horizontal directions.

{Overall Configuration of Printer 100}

The printer 100 mainly includes a housing 100a, a feed mechanism 3, a conveyance mechanism 4, a cutter 5, a head 6 (which is one example of a recording device), a paper discharge tray 7, and a controller 10.

The feed mechanism 3 has a feed tray 1, a feed roller 2, and a separating piece 31. The feed tray 1 is located below the head 6 in the housing 100a. The feed tray 1 can be inserted into and removed from the housing 100a along the front-rear direction through an opening 101 formed in a front wall of the housing 100a. That is, the feed tray 1 is movable in the front-rear direction between an inner position at which the feed tray 1 is attached to the housing 100a and an outer position at which the feed tray 1 is positioned outside the housing 100a relative to the inner position. A drawing direction from the inner position to the outer position is a direction from the rear to the front.

The feed tray 1 is configured to accommodate a roll body R and a cut paper Kp. The feed tray 1 includes a first accommodation portion 8 and a second accommodation portion 9. The first accommodation portion 8 is configured to accommodate the roll body R. The second accommodation portion 9 is configured to accommodate a plurality of cut papers Kp (which are one example of sheet-shaped media) in a stacked state. The roll body R is obtained by rolling a roll paper Rp (which is one example of a sheet-shaped medium), which is longer than the cut paper Kp, around an outer peripheral surface of a core member Rc having a cylindrical shape. Width directions of the roll paper Rp unrolled from the roll body R and the cut paper Kp in the feed tray 1 are parallel to the left-right direction.

Figure 1:
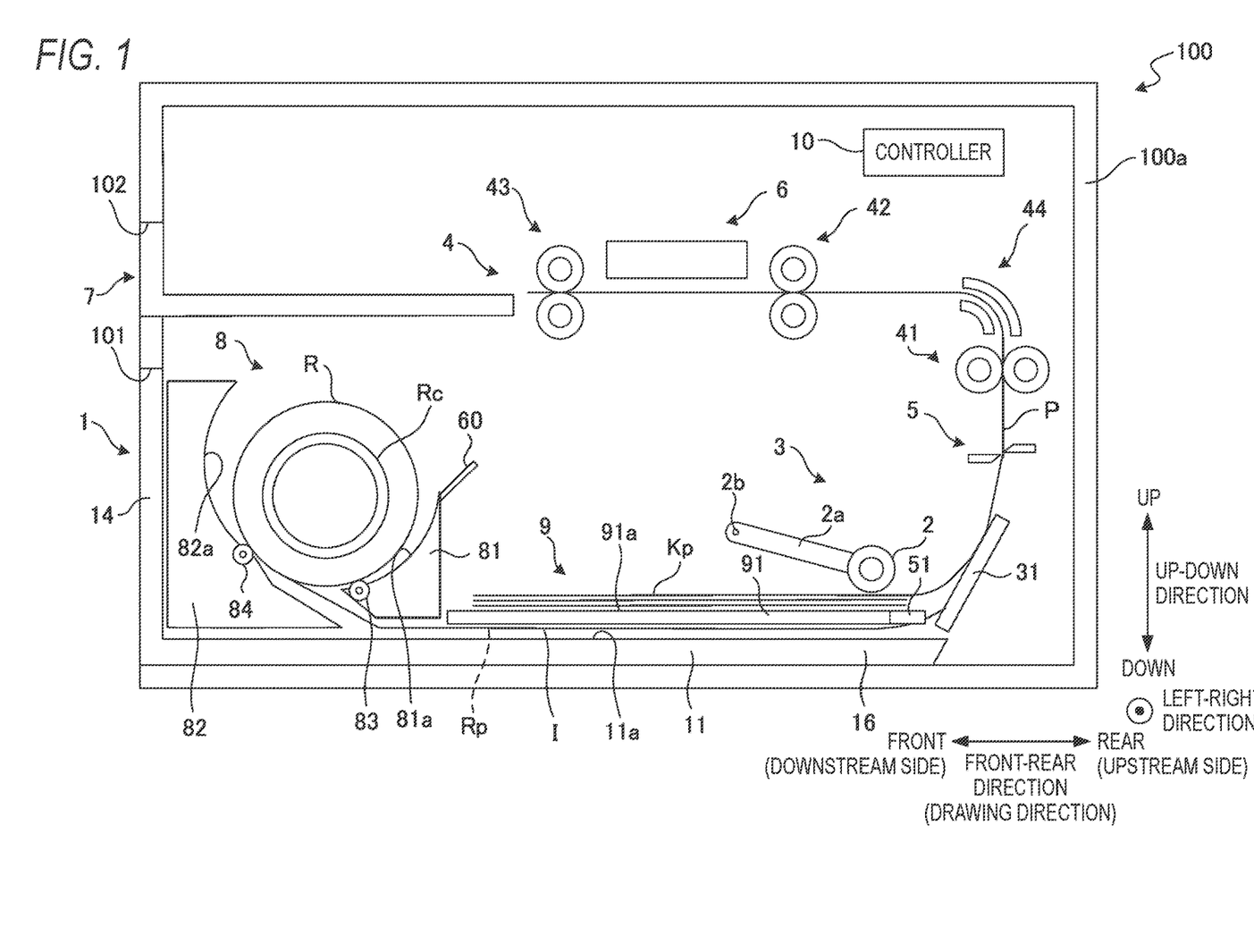
FIG. 1 is a schematic side view illustrating an internal structure of a printer according to an illustrative embodiment of the present disclosure.

FIG. 1 illustrates a state in which both the roll body R and the cut paper Kp are accommodated in the feed tray 1 for the sake of explanation. However, when recording an image with the printer 100, the feed tray 1 accommodates either the roll body R or the cut paper Kp.

The feed roller 2 is configured to selectively feed either the roll paper Rp unrolled from the roll body R accommodated in the first accommodation portion 8 or the cut paper Kp accommodated in the second accommodation portion 9. In the following description, the cut paper Kp and the roll paper Rp are referred to as "sheet P" when not distinguished from each other.

The feed roller 2 is pivotally supported at a tip of an arm 2a. The arm 2a is pivotably supported by a support shaft 2b. The support shaft 2b is supported by the housing 100a. The arm 2a is urged by an urging member (not illustrated) so that the feed roller 2 approaches a bottom surface 11a of the feed tray 1. The feed roller 2 is movable between a position where the feed roller 2 is in contact with a roller 18 (see FIGS. 3A and 3B) located on the bottom surface 11a of the feed tray 1 and a position where the feed roller 2 is separated from the roller 18 by pivoting the arm 2a about the support shaft 2b. The feed roller 2 rotates about an axis extending in the left-right direction by being driven by a feeding motor (not illustrated).

When the feeding motor is driven under the control of the controller 10, the feed roller 2 rotates, and the sheet P in contact with the feed roller 2 is imparted with a conveying force in the direction from the front to the rear. As a result, the sheet P is sent out from the feed tray 1.

The separating piece 31 is for preventing double feeding when sending the cut paper Kp from the feed tray 1. The separating piece 31 is positioned downstream of the feed tray 1 with respect to a sending direction (the direction from the front to the rear) of the sheet P by the feed roller 2.

The separating piece 31 is inclined such that a rear end portion is positioned higher than a front end portion. The separating piece 31 is positioned at a center of the feed tray 1 in the left-right direction when the sheet feed tray 1 is attached to the housing 100a and positioned at the inner position. The separating piece 31 is in contact with a central portion of the cut paper Kp in the width direction, and separates the stacked cut papers Kp into the cut paper Kp in contact with the feed roller 2 and the other cut papers Kp. The sheet P sent from the feed tray 1 and brought into contact with the separating piece 31 is guided obliquely upward.

The conveyance mechanism 4 includes an intermediate roller pair 41, a conveying roller pair 42, a paper discharge roller pair 43, and a guide member 44. The intermediate roller pair 41 is composed of a drive roller that rotates when driven by an intermediate motor (not illustrated) and a driven roller that rotates with the drive roller. When the intermediate motor (not illustrated) is driven under the control of the controller 10, the intermediate roller pair 41 rotates while nipping the sheet P to convey the sheet P. The intermediate roller pair 41 is positioned above the separating piece 31. The intermediate roller pair 41 nips and conveys upward the sheet P which is sent out from the feed tray 1 by the feed roller 2 and then guided obliquely upward by the separating piece 31. The guide member 44 is positioned above the intermediate roller pair 41. The guide member 44 guides forward the sheet P conveyed upward by the intermediate roller pair 41.

The conveying roller pair 42 is composed of a drive roller that rotates when driven by a conveying motor (not illustrated) and a driven roller that rotates with the drive roller. The paper discharge roller pair 43 is composed of a drive roller that rotates when driven by a paper discharge motor (not illustrated) and a driven roller that rotates with the drive roller. When the conveying motor and the paper discharge motor (not illustrated) are driven under the control of the controller 10, the conveying roller pair 42 and the paper discharge roller pair 43 rotate while nipping the sheet P to convey the sheet P. The conveying roller pair 42 is positioned behind the head 6, and the paper discharge roller pair 43 is positioned in front of the head 6. The conveying roller pair 42 conveys the sheet P forward while nipping the sheet P guided forward by the guide member 44. The paper discharge roller pair 43 conveys the sheet P forward while nipping the sheet P conveyed forward by the conveying roller pair 42.

The cutter 5 is positioned between the separating piece 31 and the intermediate roller pair 41. The cutter 5 is composed of, for example, a disk-shaped rotary blade and a driven blade. Moreover, the cutter 5 may composed of a rotary blade and a fixed blade. A cutting motor (not illustrated) drives the rotary blade of the cutter 5 to rotate, and the cutter 5 reciprocates along the horizontal direction. The roll paper Rp unrolled and conveyed from the roll body R is cut in the width direction of the roll paper Rp by the cutter 5 by driving the cutting motor under the control of the controller 10.

The head 6 includes a plurality of nozzles (not illustrated) formed on a lower surface and a driver IC (not illustrated). The head 6 records an image on the sheet P that is fed by the feed roller 2, sent out from the feed tray 1, and conveyed by the conveyance mechanism 4. When the driver IC is driven under the control of the controller 10, ink is ejected from the nozzles, and an image is formed on the sheet P when the sheet P conveyed by the conveyance mechanism 4 passes through an image recording position facing the lower surface of the head 6. The head 6 may be either a line type in which ink is ejected from nozzles in a fixed position, or a serial type in which ink is ejected from nozzles while moving in the left-right direction.

The paper discharge tray 7 is located in front of the head 6 and above the feed tray 1 in the housing 100a. The paper discharge tray 7 can be inserted into and removed from the housing 100a along the front-rear direction through an opening 102 formed in the front wall of the housing 100a. The paper discharge tray 7 receives the sheet P on which an image is formed by the head 6 and which is conveyed forward by the paper discharge roller pair 43.

The controller 10 is connected to the feeding motor, the intermediate motor, the conveying motor, the paper discharge motor, the cutting motor, and the driver IC via an internal bus (not illustrated). The controller 10 includes a central processing unit (which will be abbreviated as CPU), a read only memory (which will be abbreviated as ROM), and a random access memory (which will be abbreviated as RAM). The ROM accommodates programs and data for the CPU to perform various controls. The RAM temporarily stores data used when the CPU executes programs.

{Configuration of Feed Tray 1}

Next, the configuration of the feed tray 1 will be described with further reference to FIGS. 2, 3A, 3B, 8A, and 8B. In the following description, an orientation of each part of the feed tray 1 will be described based on the posture of the feed tray 1 attached to the housing 100a.

Figure 2:
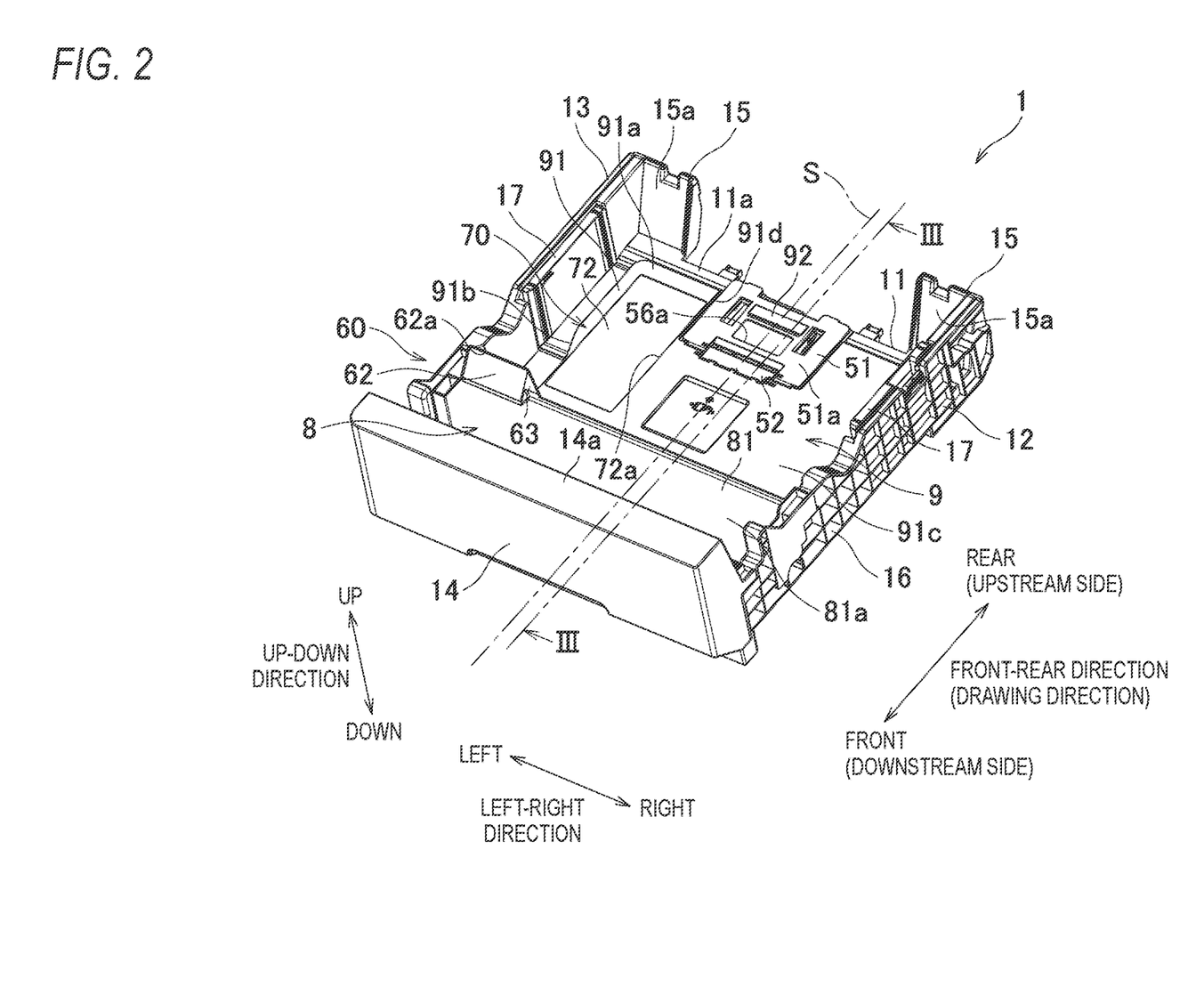
FIG. 2 is a perspective view of a feed tray illustrated in FIG. 1.

The feed tray 1 has a body portion 16. As illustrated in FIG. 2, the body portion 16 includes a bottom wall 11 and side walls 12 to 15 provided at edges of the bottom wall 11, and is formed in a box shape that opens upward.

The bottom wall 11 extends in a plane perpendicular to the up-down direction. An upper surface of the bottom wall 11 serves as the bottom surface 11a of the feed tray 1. The bottom surface 11a is perpendicular to the up-down direction. The side walls 12 and 13 extend upward from both left and right edges of the bottom wall 11. The side walls 12 and 13 extend in the front-rear direction from a front end portion to a rear end portion of the bottom wall 11. The side wall 14 extends upward from the front edge of the bottom wall 11. The side wall 14 extends in the left-right direction from a right end portion to a left end portion of the bottom wall 11.

Two side walls 15 are provided at a rear edge of the bottom wall 11. The two side walls 15 are positioned at both left and right end portions of the rear edge of the bottom wall 11. The side wall 15 includes a guide surface 15a that is connected to the rear end portion of the bottom surface 11a and that is inclined such that its upper end portion is located rearward from its lower end portion. When the feed tray 1 is attached to the housing 100a, the separating piece 31 (see FIG. 1) is positioned between two laterally aligned side walls 15. The guide surface 15a of the side wall 15, together with the separating piece 31, guides the sheet P sent rearward by the feed roller 2 obliquely upward.

The feed tray 1 is located in a pair of side walls 12 and 13 and has a pair of side guides 17 separated from each other in the left-right direction. The side guides 17 are supported by the bottom wall 11 so as to be movable in the left-right direction, and are located facing each other in the left-right direction. The one side guide 17 and the other side guide 17 are interlockingly movable in directions of approaching and separating from each other by a known interlocking mechanism (not illustrated) including, for example, racks facing each other and pinions meshing with both racks.

As described above, the feed tray 1 has the first accommodation portion 8 that can accommodate the roll body R and the second accommodation portion 9 that can accommodate a plurality of cut papers Kp in a stacked state. The first accommodation portion 8 and the second accommodation portion 9 are aligned along the drawing direction. The first accommodation portion 8 is located downstream of the second accommodation portion 9 with respect to the drawing direction.

The first accommodation portion 8 accommodates the roll body R in a posture in which its axial direction is parallel to the left-right direction. The first accommodation portion 8 has two support stands 81 and 82 and two rollers 83 and 84, as illustrated in FIG. 1.

The two support stands 81 and 82 are spaced apart from each other in the front-rear direction. The support stand 81 is located behind the support stand 82. Both of the two support stands 81 and 82 extend over substantially the entire width of the inner space of the body portion 16 along the left-right direction. A first display portion 60 having a display surface 62 for displaying setting information on the setting of the sheet P is provided on an upper portion of the support stand 81. Details of the first display portion 60 will be described below.

The two rollers 83 and 84 are spaced apart from each other in the front-rear direction. The roller 83 is attached to the support stand 81 so as to be rotatable around a rotation axis extending in the left-right direction. The roller 83 is attached to a support surface 81a of the support stand 81 facing downstream in the drawing direction. The roller 84 is attached to the support stand 82 so as to be rotatable around a rotation axis extending in the left-right direction. The roller 84 is attached to a support surface 82a of the support stand 82 facing upstream in the drawing direction. The rollers 83 and 84 support the roll body R from below while being in contact with an outer peripheral surface of a lower portion of the roll body R.

The roll paper Rp pulled out from the roll body R accommodated in the first accommodation portion 8 is pulled out from a front side of the support stand 81 to a rear side of the support stand 81 through a gap between a lower surface of the support stand 81 and the bottom surface 11a of the feed tray 1.

The second accommodation portion 9 has a support plate 91 provided with a support surface 91a for supporting the plurality of stacked cut papers Kp from below. The support plate 91 is located substantially parallel to the bottom surface 11a of the feed tray 1, and an upper surface thereof serves as the support surface 91a. The support plate 91 extends in the front-rear direction from a vicinity of the support stand 81 of the first accommodation portion 8 to a vicinity of a rear end portion of the bottom wall 11 of the feed tray 1. As illustrated in FIG. 2, the support surface 91a of the support plate 91 is provided with a second display portion 70 having a display surface 72 for displaying setting information on the setting of the sheet P. Details of the second display portion 70 will be described below.

As illustrated in FIG. 1, the bottom surface 11a of the feed tray 1 and the lower surface of the support plate 91 define a passing path I for the roll paper Rp unrolled from the roll body R accommodated in the first accommodation portion 8. The support plate 91 vertically partitions the roll paper Rp unrolled from the roll body R and the cut paper Kp accommodated in the second accommodation portion 9.

Figure 3A:
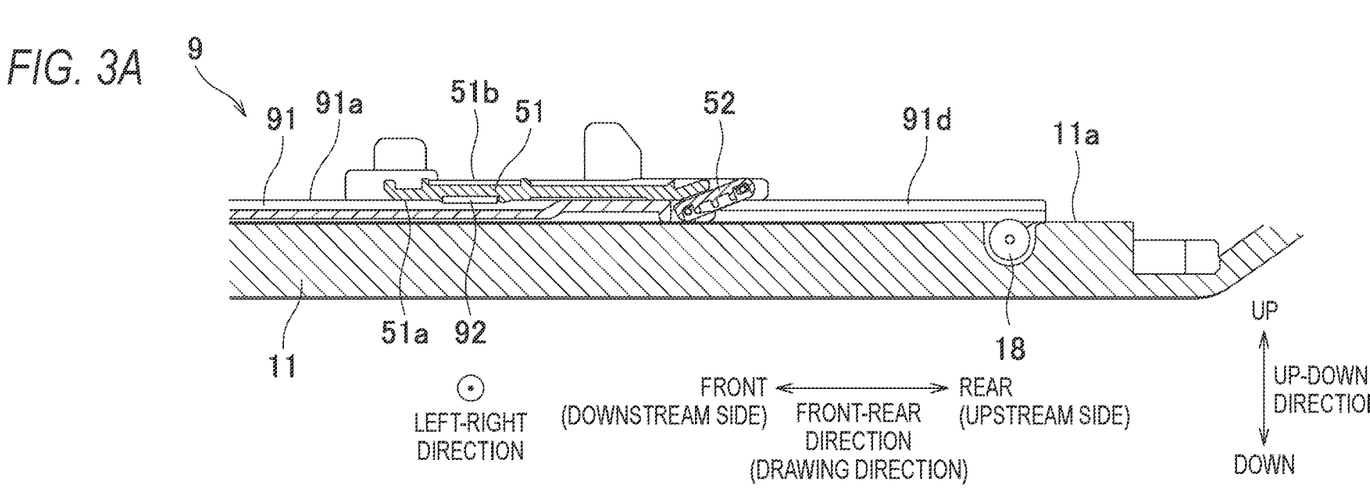
Figure 3B:
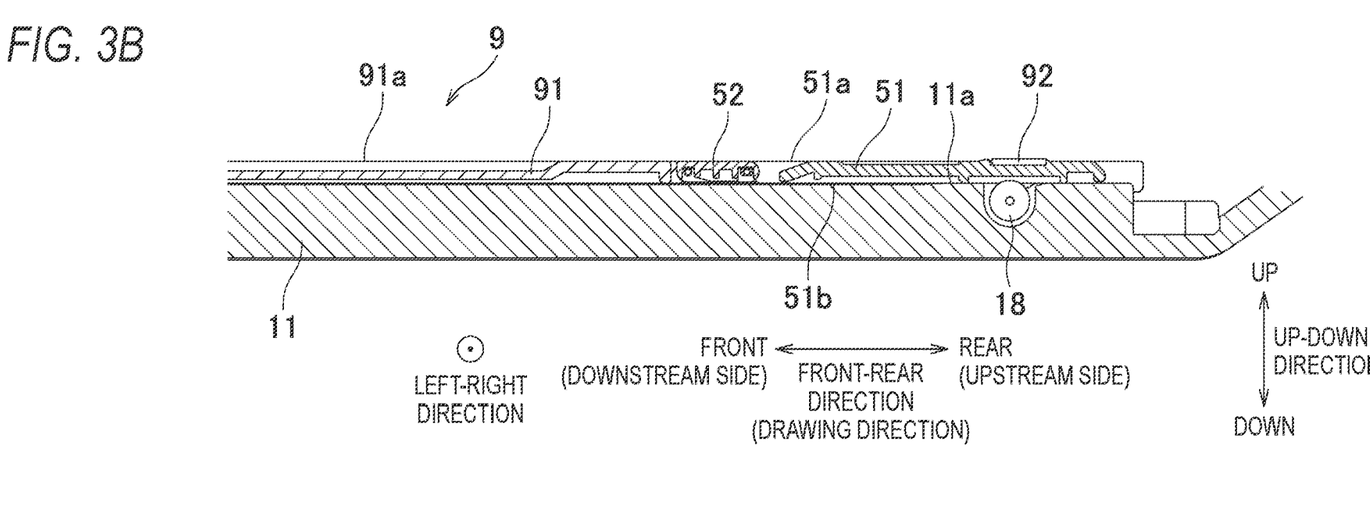

The bottom surface 11a of the feed tray 1 supports the roll paper Rp passing through the passing path I. Further, as illustrated in FIGS. 3A and 3B, a roller 18 is located on the bottom surface 11a. The roller 18 is located near the rear end portion of the bottom surface 11a. The feed roller 2 can be brought into contact with the roller 18.

Figure 8A:
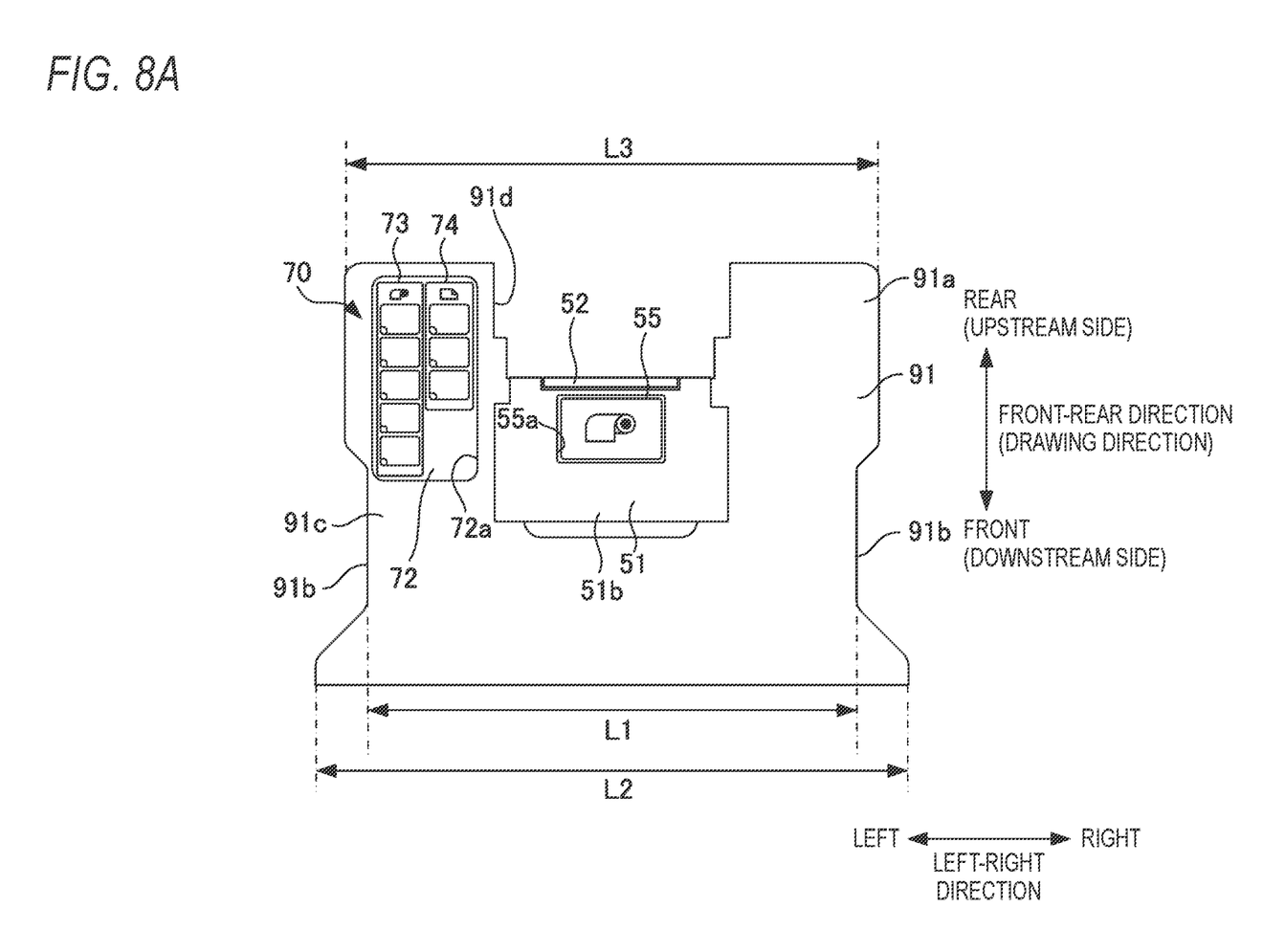
Figure 8B:
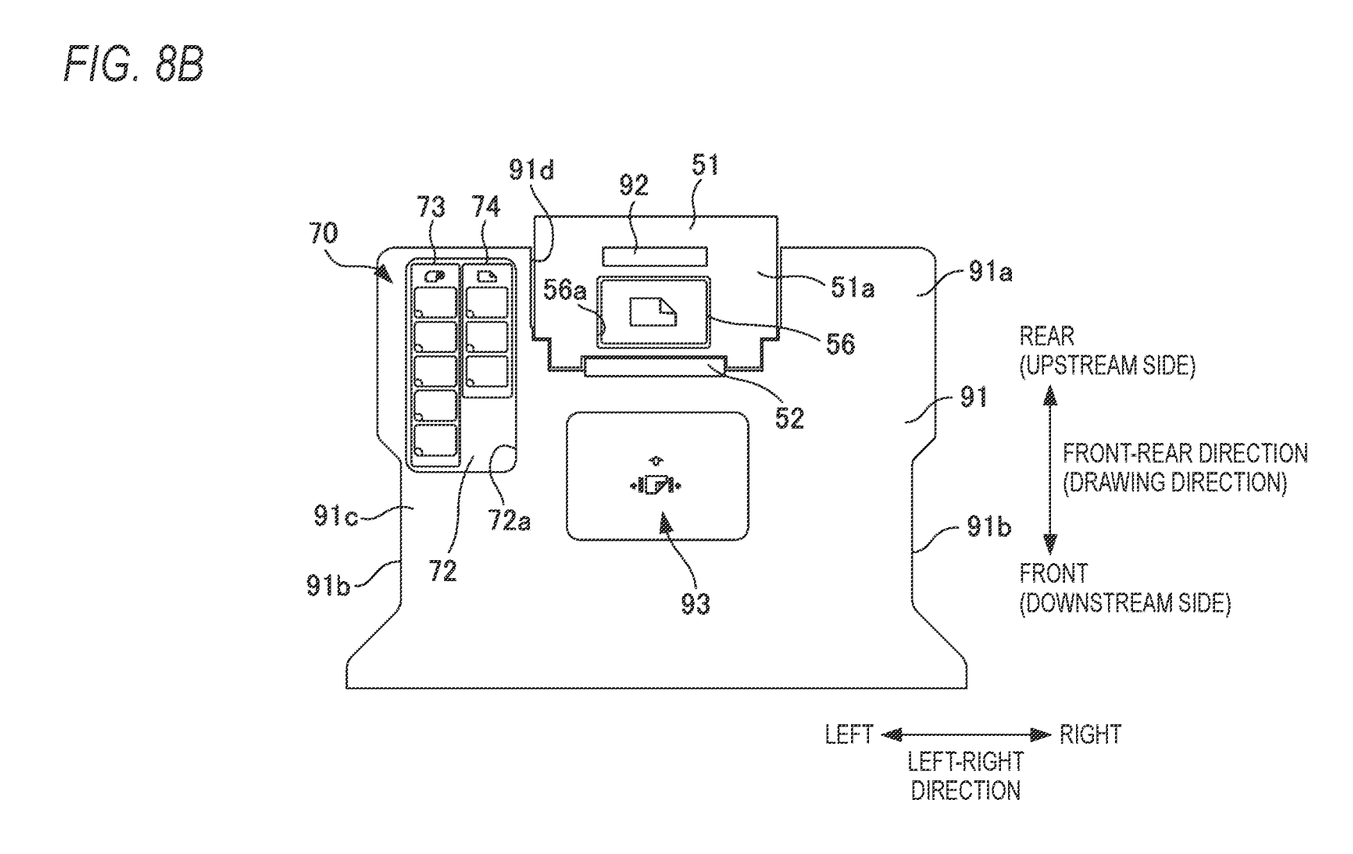

As illustrated in FIGS. 2, 8A, and 8B, a pair of notches 91b are formed at both end portions of the support plate 91 in the left-right direction. As illustrated in FIG. 8A, a length L1 in the left-right direction of a part of the support plate 91 where the notches 91b are formed is shorter than each of lengths L2 and L3 in the left-right direction of a part where the notches 91b are not formed. That is, the part of the support plate 91 where the notches 91b are formed is a narrow portion 91c that is narrower than the other portions. In the support plate 91, the length L2 in the left-right direction of the part located downstream of the narrow portion 91c in the drawing direction is substantially equal to the length of the inner space of the body portion 16 in the left-right direction. The length L3 in the left-right direction of the part located upstream of the narrow portion 91c in the drawing direction is smaller than the length L2.

The length L1 is the length of a central portion of the narrow portion 91c in the drawing direction. The length of the narrow portion 91c in the left-right direction is the smallest at the central portion in the drawing direction, and gradually increases with increasing distance from the central portion toward the upstream side and the downstream side in the drawing direction. The narrow portion 91c is located forward of the roller 18 in the front-rear direction. The length L1 of the central portion of the narrow portion 91c in the drawing direction is shorter than the width of the roll body R that can be accommodated in the first accommodation portion 8. Therefore, both lateral end portions of the roll paper Rp traveling along the passing path I toward a position where the roller 18 is located pass laterally outside the narrow portion 91c of the support plate 91.

A notch 91d is formed in the rear end portion of the support plate 91, as illustrated in FIG. 2. The notch 91d is located in a central portion of the support plate 91 in the left-right direction. The notch 91d is located on a movement locus of the feed roller 2 moving from a position where the feed roller 2 is in contact with the roller 18 to a position where the feed roller 2 is separated from the roller 18. The roller 18 provided on the bottom surface 11a of the feed tray 1 is positioned in the notch 91d of the support plate 91 when viewed from above, as illustrated in FIG. 3A. A flap 51 is attached via a link member 52 to an inner side of the notch 91d in the support plate 91.

The flap 51 is a plate-shaped member. One surface of the flap 51 is a support surface 51a that supports the plurality of cut papers Kp accommodated in the second accommodation portion 9. The flap 51 is configured to be rotatable around an end portion on a side where the link member 52 is attached. The flap 51 is configured to be movable between a first position (see FIG. 3A) where the flap 51 is retracted from the movement locus of the feed roller 2 and a second position (see FIGS. 2 and 3B) where the flap 51 is located on the movement locus of the feed roller 2 with the support surface 51a facing upward by rotating around the end portion on the side where the link member 52 is attached.

A base pad 92 is provided on the support surface 51a of the flap 51. As illustrated in FIGS. 2 and 3B, when the flap 51 is located at the second position, a portion where the base pad 92 is provided is positioned on the movement locus of the feed roller 2. A coefficient of static friction of the base pad 92 is greater than that of the support surface 51a. A relationship of friction coefficient between the base pad 92 and the support surface 51a may be defined not only by static friction coefficients as in the present illustrative embodiment, but also by dynamic friction coefficients, or may also be defined by the coefficient of static friction on one side and the coefficient of dynamic friction on the other side.

When recording an image on the roll paper Rp, the flap 51 is located at the first position (a state illustrated in FIG. 3A). In this state, the roll body R is accommodated in the first accommodation portion 8, and the roll paper Rp is set. That is, the roll paper Rp is unrolled from the roll body R and sent to the position where the roller 18 is provided. When the feed tray 1 is attached to the housing 100a, the roll paper Rp is nipped between the roller 18 and the feed roller 2, and the roll paper Rp can be fed.

In this case, when the cut paper Kp is accommodated in the second accommodation portion 9, the feed roller 2 comes into contact with the cut paper Kp when the feed tray 1 is attached to the housing 100a. Therefore, the roll paper Rp cannot be fed. Therefore, when recording an image on the roll paper Rp, the cut paper Kp must not be accommodated in the second accommodation portion 9.

Also, when recording an image on the cut paper Kp, the flap 51 is located at the second position (a state illustrated in FIGS. 2 and 3B). In this state, the cut paper Kp is accommodated in the second accommodation portion 9. When the feed tray 1 is attached to the housing 100a, the feed roller 2 comes into contact with the cut paper Kp and the cut paper Kp can be fed.

{Configuration of First Display Portion}

Figure 4:
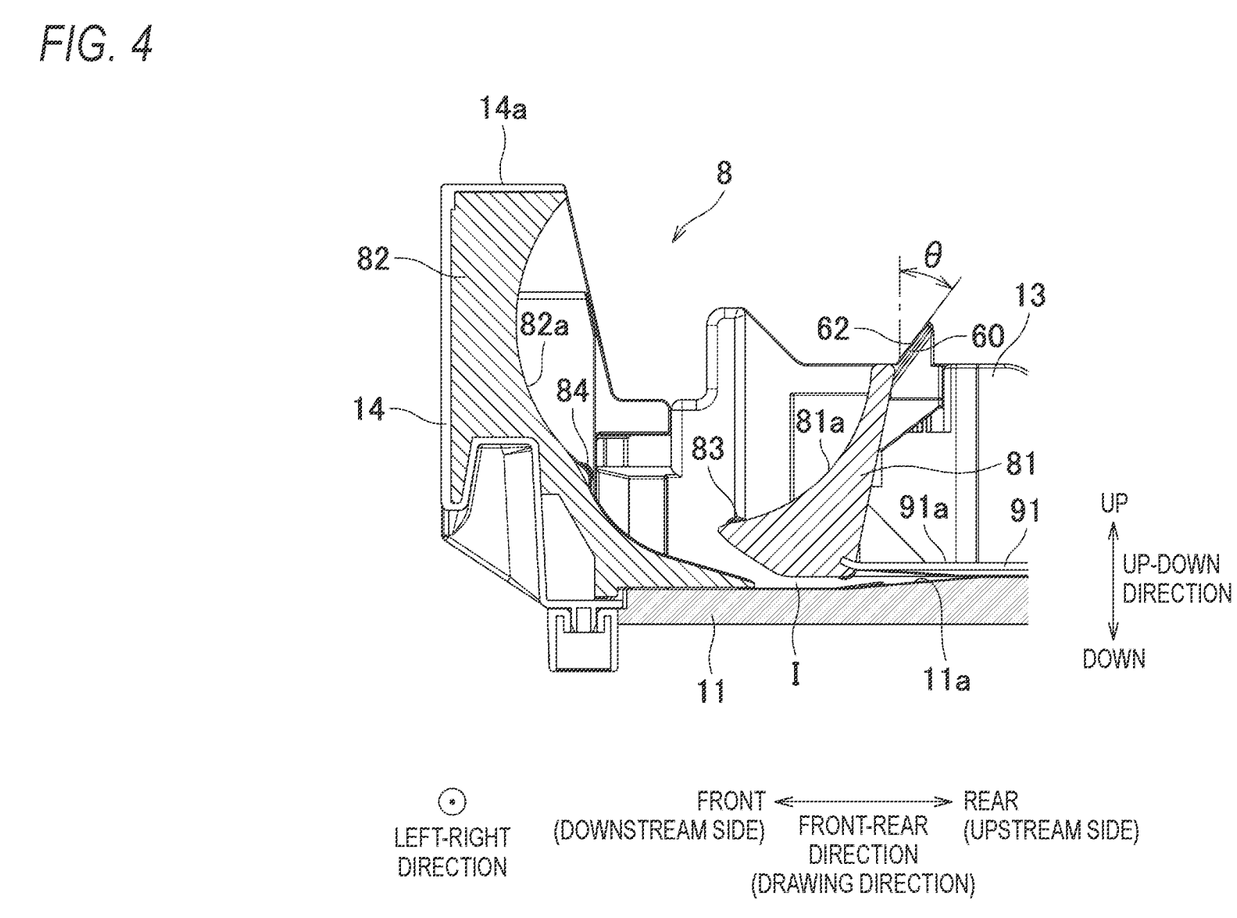
FIG. 4 is a cross-sectional view taken along the line of a first accommodation portion in the feed tray illustrated in FIG. 2.
Figure 5:
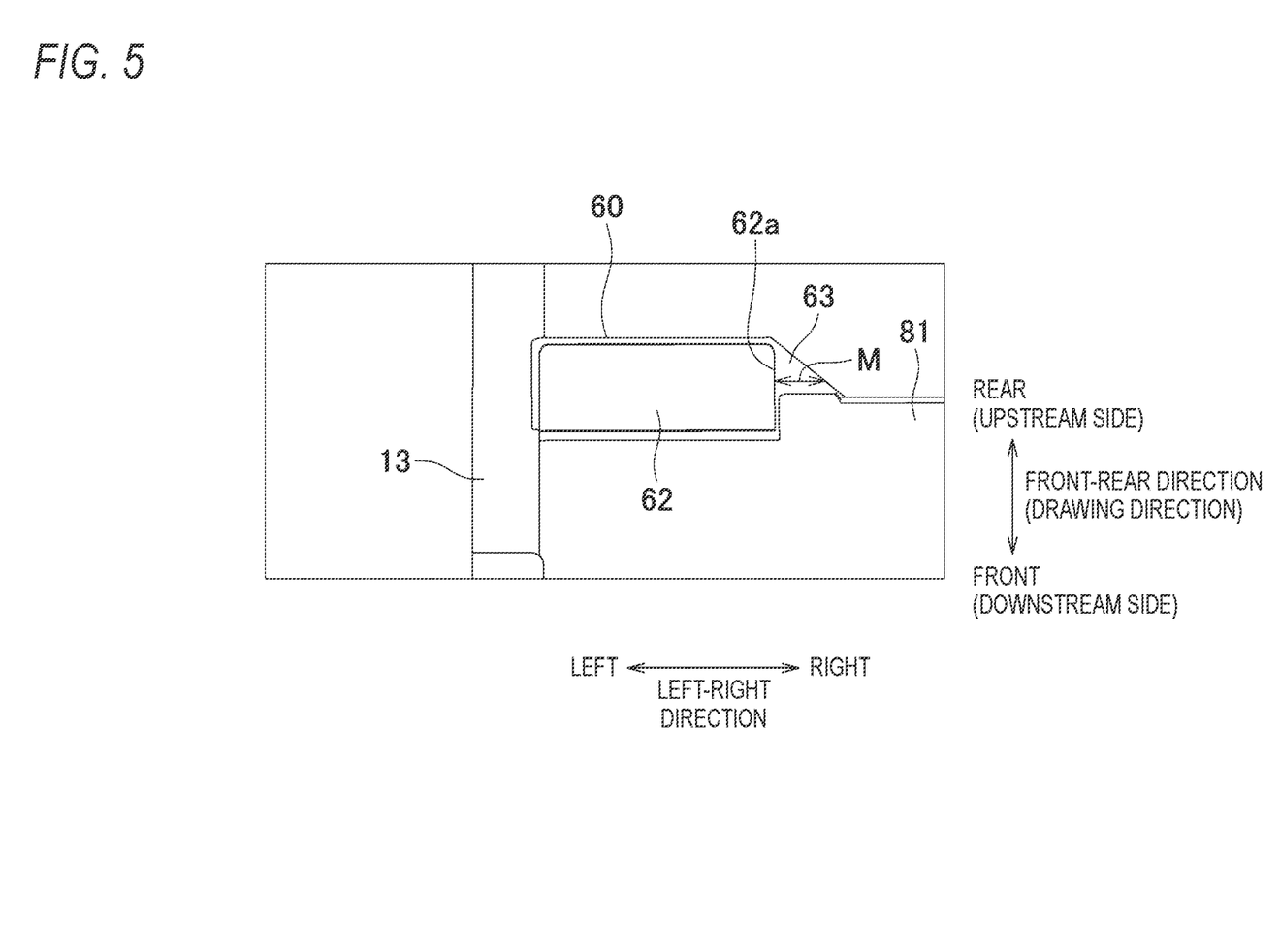
FIG. 5 is a top view of a first display portion.

Next, the configuration of the first display portion 60 will be described with further reference to FIGS. 4 to 6. The first display portion 60 is provided in an upper portion of the support stand 81 in the first accommodation portion 8 that accommodates the roll body R. As illustrated in FIG. 2, the first display portion 60 is provided on one-side (left-side) end portion of the support stand 81 in the left-right direction. That is, the first display portion 60 is provided at a position (a position through which a straight line S in FIG. 2 passes) shifted from a center position of the second accommodation portion 9 in the left-right direction. The first display portion 60 protrudes upward from the upper portion of the support stand 81, as illustrated in FIGS. 2 and 4.

The first display portion 60 has a plate shape. A lower end portion of the first display portion 60 is connected to an upper end portion of the support stand 81. As illustrated in FIG. 4, the first display portion 60 is inclined such that the upper end portion is positioned upstream in the drawing direction from the lower end portion. That is, the first display portion 60 protrudes from the upper portion of the support stand 81 of the first accommodation portion 8 toward the second accommodation portion 9.

A plane of the first display portion 60 facing downstream in the drawing direction is the display surface 62 to which a cut paper accommodation prohibition label 64 (see FIG. 6) is attached or stuck. In FIGS. 2 and 5, illustration of the cut paper accommodation prohibition label 64 is omitted. The display surface 62 is inclined such that an upstream end portion in the drawing direction is positioned higher than a downstream end portion in the pull-out direction. In the illustrative embodiment, an angle θ (see FIG. 4) between a vertical plane and the display surface 62 is 45°. The angle θ is not limited to 45°. As illustrated in FIG. 2, the display surface 62 is provided with a recess 62a that is thinner than its surroundings. The cut paper accommodation prohibition label 64 is stuck to a bottom surface of the recess 62a.

A protruding portion 63 is provided at an end portion of the first display portion 60 on a side of the center position (a position through which the straight line S in FIG. 2 passes) of the second accommodation portion 9 in the left-right direction. As illustrated in FIG. 5, the protruding portion 63 has a protruding amount M toward a center position side (right side in the figure) of the second accommodation portion 9 in the left-right direction, which gradually increases from an upper end to a lower end.

Figure 6:
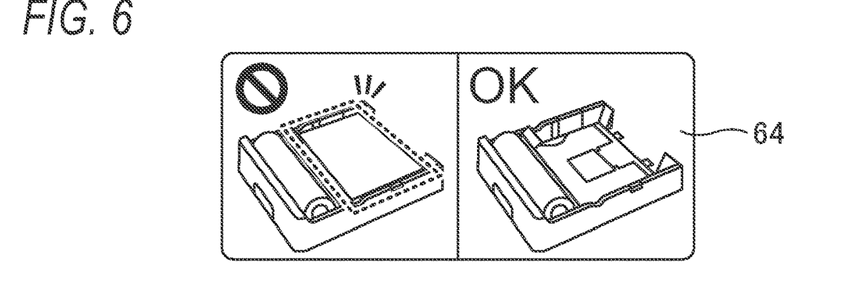
FIG. 6 is a view illustrating a cut paper accommodation prohibition label on the first display portion.

As illustrated in FIG. 6, the cut paper accommodation prohibition label 64 has an illustration showing that when the roll paper Rp unrolled from the roll body R is fed, the cut paper Kp is not accommodated in the second accommodation portion 9.

{Configuration of Second Display Portion}

Further, the configuration of the second display portion 70 will be described with further reference to FIG. 7. The second display portion 70 has the display surface 72 provided on the support surface 91a of the support plate 91, as illustrated in FIGS. 2, 8A, and 8B. A bottom surface of a recess 72a formed thinner than the surroundings on the support surface 91a is the display surface 72. The display surface 72 is provided at one-side (left-side) end portion in the left-right direction of the support surface 91a. The display surface 72 has a substantially rectangular shape elongated in the drawing direction when viewed from above.

Figure 7:
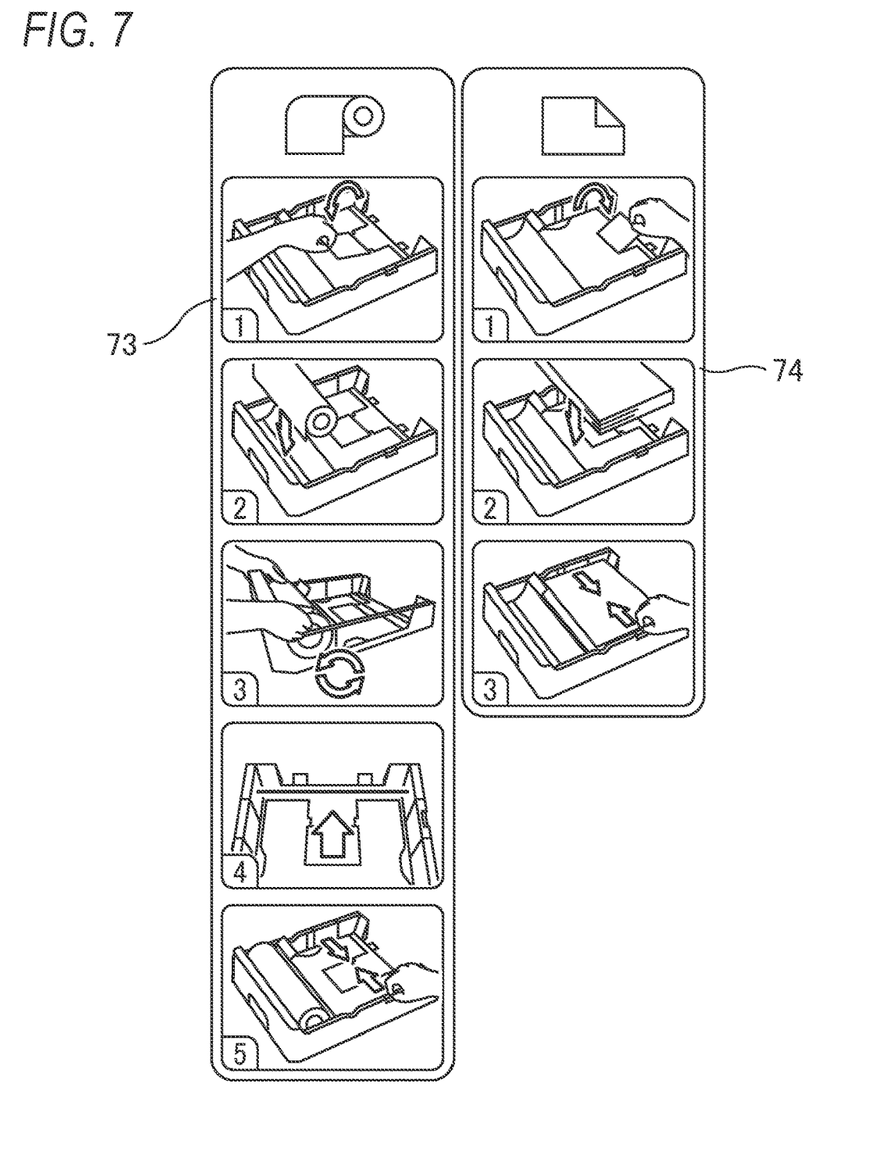
FIG. 7 is a view illustrating a roll paper setting procedure label and a cut paper setting procedure label on a second display portion.

A roll paper setting procedure label 73 and a cut paper setting procedure label 74 illustrated in FIG. 7 are stuck to the display surface 72. In FIG. 2, the roll paper setting procedure label 73 and the cut paper setting procedure label 74 are not illustrated.

The roll paper setting procedure label 73 is a label for notifying a user of information on a procedure for accommodating the roll body R in the first accommodation portion 8, unrolling the roll body R, and setting the roll paper Rp. As illustrated in FIG. 7, the roll paper setting procedure label 73 has illustrations for illustrating setting procedures (1) to (5) of the roll paper Rp. The procedures (1) to (5) for setting the roll paper Rp are as follows. In the procedure (1), the flap 51 is placed in the first position. In the procedure (2), the roll body R is accommodated in the first accommodation portion 8. In the procedure (3), the roll body R is rotated to unroll the roll paper Rp from the roll body R. In the procedure (4), the roll paper Rp unrolled from the roll body R is sent to the feeding position (where the roller 18 is provided). In the procedure (5), the positions of the side guides 17 are adjusted so that the side guides 17 are in contact with both ends of the roll paper Rp in the left-right direction.

The cut paper setting procedure label 74 is a label for notifying the user of information on a procedure for accommodating and setting the cut paper Kp in the second accommodation portion 9. The cut paper setting procedure label 74 has illustrations for illustrating setting procedures (1) to (3) of the cut paper Kp. The procedures (1) to (3) for setting the cut paper Kp are as follows. In the procedure (1), the flap 51 is placed in the second position. In the procedure (2), the cut paper Kp is accommodated in the second accommodation portion 9. In the procedure (3), the positions of the side guides 17 are adjusted so that the side guides 17 are in contact with both ends of the cut paper Kp in the left-right direction.

{Other Displays}

As illustrated in FIG. 8A, a roll paper label 55 is stuck to a surface 51b of the flap 51, which faces upward when the flap 51 is in the first position, to inform the user that the roll paper Rp is to be set. The roll paper label 55 is stuck to a bottom surface of a recess 55a formed thinner than the surroundings in the surface 51b. An illustration of the roll body R is drawn on the roll paper label 55.

Also, as illustrated in FIG. 8B, a cut paper label 56 is stuck to the support surface 51a of the flap 51, which faces upward when the flap 51 is at the second position, to inform the user that the cut paper Kp is to be set. The cut paper label 56 is stuck to a bottom surface of a recess 56a formed thinner than the surroundings in the support surface 51a. An illustration of the cut paper Kp is drawn on the cut paper label 56.

As illustrated in FIG. 8B, the support surface 91a of the support plate 91 is provided with a mark 93 indicating a front and back orientation of the cut paper Kp to be set. As illustrated in FIG. 8A, the mark 93 is covered by the flap 51 when the flap 51 is in the first position.

As described above, in the printer 100 of the illustrative embodiment, the feed tray 1 includes the first accommodation portion 8 that can accommodate the roll body R in which the roll paper Rp is rolled in a roll, the second accommodation portion 9 that can accommodate a plurality of cut papers Kp in a stacked state, and the first display portion 60 and the second display portion 70, both of which display setting information on the setting of the sheet P.

As described above, since the feed tray 1 having the first accommodation portion 8 and the second accommodation portion 9 has the first display portion 60 and the second display portion 70 that display the setting information on the setting of the sheet P, the user can smoothly set the sheet P.

Also, in the printer 100 of the illustrative embodiment described above, the first display portion 60 is provided in the upper portion of the support stand 81 in the first accommodation portion 8. By providing the first display portion 60 on the upper portion of the support stand 81 that is a component forming the first accommodation portion 8 in this way, the first display portion 60 is easily visible.

Further, in the printer 100 of the illustrative embodiment described above, the feed tray 1 is movable between the inner position at which the feed tray 1 is attached to the housing 100a and the outer position at which the feed tray 1 is positioned outside the housing 100a relative to the inner position. The first accommodation portion 8 and the second accommodation portion 9 are aligned along the drawing direction of the feed tray 1 from the inner position to the outer position. The first accommodation portion 8 is located downstream of the second accommodation portion 9 with respect to the drawing direction. Thus, by providing the first display portion 60 on the upper portion of the support stand 81 that forms the first accommodation portion 8 located downstream of the second accommodation portion 9 in the drawing direction, the first display portion 60 is more easily visible.

Further, in the printer 100 of the illustrative embodiment described above, the first display portion 60 is provided at a position shifted from the central position of the second accommodation portion 9 in the left-right direction. Therefore, when the cut paper Kp is accommodated in the second accommodation portion 9, the first display portion 60 is less obstructive.

Also, in the printer 100 of the illustrative embodiment described above, the first display portion 60 protrudes from the upper portion of the support stand 81 forming the first accommodation portion 8 toward the second accommodation portion 9, and the protruding portion 63 is formed at the end portion of the first display portion 60, which is the end portion on the center position side of the second accommodation portion 9, so that the protruding amount toward the center position side in the left-right direction gradually increases from the upper end to the lower end. When there is a corner portion at the end portion of the first display portion 60, which is the end portion on the center position side of the second accommodation portion in the left-right direction, the cut paper Kp is caught on the corner when the cut paper Kp is accommodated in the second accommodation portion 9. In this configuration, by providing the protruding portion 63, no corner portion is formed at the end portion of the first display portion 60, which is the end portion on the center position side of the first display portion 60 in the left-right direction. Therefore, when the cut paper Kp is accommodated in the second accommodation portion 9, the cut paper Kp is less likely to get caught in the first display portion 60.

Additionally, in the printer 100 of the illustrative embodiment described above, the first display portion 60 has the display surface 62 on which the setting information is displayed. The display surface 62 is inclined such that the upstream end portion in the drawing direction is positioned higher than the downstream end portion in the drawing direction. Therefore, the visibility of the display surface 62 of the first display portion 60 is improved.

Furthermore, in the printer 100 of the illustrative embodiment described above, the second accommodation portion 9 has the support plate 91 provided with the support surface 91a for supporting the accommodated cut paper Kp. The second display portion 70 has the display surface 72 on which the setting information is displayed. The display surface 72 is provided on the support surface 91a. Therefore, it is easy to notice the setting information displayed on the display surface 72 of the second display portion 70 before setting the cut paper Kp in the second accommodation portion 9.

In addition, the printer 100 of the illustrative embodiment described above includes the feed roller 2 which can selectively feed either the roll paper Rp unrolled from the roll body R accommodated in the first accommodation portion 8 or the cut paper Kp accommodated in the second accommodation portion 9. The first display portion 60 displays information indicating that the cut paper Kp is not accommodated in the second accommodation portion 9 when the roll paper Rp unrolled from the roll body R is fed. In this configuration, the feed roller 2 for feeding the roll paper Rp unrolled from the roll body R accommodated in the first accommodation portion 8 and the feed roller 2 for feeding the cut paper Kp accommodated in the second accommodation portion 9 are common. Therefore, it is not possible to set both the roll paper Rp and the cut paper Kp on the feed tray 1 so that both can be fed. Therefore, by displaying information indicating that the cut paper Kp is not accommodated in the second accommodation portion 9 when the roll paper Rp unrolled from the roll body R is fed on the first display portion 60, the setting work of the sheet P by the user can be performed smoothly.

Also, in the printer 100 of the illustrative embodiment described above, the second display portion 70 displays information on the procedure for accommodating the roll body R in the first accommodation portion 8, unrolling the roll body R, and setting the roll paper Rp and information on the procedure for accommodating and setting the cut paper Kp in the second accommodation portion 9. In the configuration in which the second display portion 70 is provided on the support surface 91a of the second accommodation portion 9, when the roll body R is accommodated in the first accommodation portion 8 and the roll body R is unrolled, and then the roll paper Rp is set, if the cut paper Kp is accommodated in the second accommodation portion 9, the user cannot visually recognize the information on the setting procedure of the second display portion 70. In this configuration, the first display portion 60 that displays information that the second accommodation portion 9 does not accommodate the cut paper Kp when the roll body R is fed is provide on the upper portion of the support stand 81 that forms the first accommodation portion 8. Therefore, the user can be prompted to remove the cut paper Kp from the second accommodation portion 9.

Furthermore, in the printer 100 of the illustrative embodiment described above, the support plate 91 of the second accommodation portion 9 defines the passing path I of the roll paper Rp unrolled from the roll body R accommodated in the first accommodation portion 8. The support plate 91 has the narrow portion 91c of which the length in the left-right direction is shorter than the width of the roll body R. By providing the narrow portion 91c, the position of the roll paper Rp unrolled from the roll body R and passing under the support plate 91 can be visually recognized. Therefore, the setting work of the roll paper Rp to be accommodated in the first accommodation portion 8 can be performed smoothly.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the illustrative embodiment described above, the case where the first display portion 60 displays information indicating that the cut paper Kp is not accommodated in the second accommodation portion 9 when the roll paper Rp unrolled from the roll body R is fed is described. Also, the case where the second display portion 70 displays the information on the procedure for accommodating the roll body R in the first accommodation portion 8, unrolling the roll body R, and setting the roll paper Rp and the information on the procedure for accommodating and setting the cut paper Kp in the second accommodation portion 9 is described. However, the information displayed on the first display portion 60 and the second display portion 70 is not limited to this, and may be setting information on the setting of the sheet P.

That is, for example, the first display portion 60 may display information indicating that the sheet P is accommodated in only one of the first accommodation portion 8 and the second accommodation portion 9. Further, for example, the first display portion 60 may display information indicating that the sheet P may be accommodated in both the first accommodation portion 8 and the second accommodation portion 9 when feeding the cut paper Kp. Also, the second display portion 70 may display only one of: the information on the procedure for accommodating the roll body R in the first accommodation portion 8, unrolling the roll body R, and setting the roll paper Rp; and the information on the procedure for accommodating and setting the cut paper Kp in the second accommodation portion 9.

Further, in the illustrative embodiment described above, the case where the feed tray 1 is provided with the first display portion 60 and the second display portion 70 is described. However, the present disclosure is not limited to this. The feed tray 1 may be provided with at least one display portion to display setting information on the setting of the sheet P.

Also, in the illustrative embodiment described above, the case where the first display portion 60 is provided on the upper portion of the support stand 81 in the first accommodation portion 8 and the second display portion 70 is provided on the support surface 91a of the support plate 91 in the second accommodation portion 9 is described. However, the position of the display portion is not limited to this. That is, for example, the display portion may be provided on an upper surface 14a (see FIGS. 2 and 4) of the side wall 14. Furthermore, the display portion may be provided on the support surface 81a (see FIGS. 2 and 4) of the support stand 81. The first display portion 60 and the second display portion 70 may be provided on the same member (for example, the support stand 81).

Further, in the illustrative embodiment described above, the case where the first display portion 60 and the second display portion 70 both have labels (the cut paper accommodation prohibition label 64, the roll paper setting procedure label 73, and the cut paper setting procedure label 74) stuck to the display surfaces 62 and 72 is described, but the present disclosure is not limited to this. For example, the setting information may be engraved directly on the display surfaces 62 and 72 instead of labels. The display surfaces 62 and 72 may also be displays that display setting information.

Also, in the illustrative embodiment described above, the case where the recess 62a to which the cut paper accommodation prohibition label 64 is stuck is provided in the first display portion 60 and the recess 72a to which the roll paper setting procedure label 73 and the cut paper setting procedure label 74 are stuck is provided in the second display portion 70 is described, but the present disclosure is not limited to this. That is, the recess 62a and the recess 72a may not be provided.

In addition, in the illustrative embodiment described above, the case where the first accommodation portion 8 and the second accommodation portion 9 are aligned along the drawing direction and the first accommodation portion 8 is located downstream of the second accommodation portion 9 in the drawing direction is described, but the present disclosure is not limited to this. That is, the first accommodation portion 8 may be located upstream of the second accommodation portion 9 in the drawing direction. Also, the first accommodation portion 8 and the second accommodation portion 9 do not have to be aligned along the drawing direction.

Further, in the illustrative embodiment described above, the case where the first display portion 60 is provided at a position shifted from the center position in the left-right direction of the second accommodation portion 9 is described, but the present disclosure is not limited to this. The first display portion 60 may be provided at the center position of the second accommodation portion 9.

Also, in the illustrative embodiment described above, the case where the protruding portion 63 is formed at the end portion of the first display portion 60, which is the end portion on the center position side of the second accommodation portion 9 is described, but the protruding portion 63 may be omitted.

Furthermore, in the illustrative embodiment described above, the case where the display surface 62 of the first display portion 60 is inclined is described, but the present disclosure is not limited to this. That is, for example, the display surface 62 may be a vertical surface or a horizontal surface.

Further, in the illustrative embodiment described above, the case where the feed roller 2 for feeding the roll paper Rp and the feed roller 2 for feeding the cut paper Kp are common is described, but the present disclosure is not limited to this. A configuration having two feed rollers: a feed roller for feeding the roll paper Rp; and a feed roller for feeding the cut paper Kp, may be employed.

Further, in the illustrative embodiment described above, the case where the support plate 91 has the narrow portion 91c of which the length in the left-right direction is shorter than the width of the roll body R is described, but the present disclosure is not limited to this. The support plate 91 may have a constant length in the left-right direction in the drawing direction.

Further, in the above-described illustrative embodiments, the roll body R is obtained by rolling the roll paper Rp around the outer peripheral surface of the core member Rc, but the present disclosure is not limited to this. The roll body R may have no core and does not include the core member Rc.

The present disclosure may be applied to all image recording apparatuses provided with a feed tray that is configured to accommodate the roll body R and the cut paper Kp. That is, for example, the present disclosure may be applied not only to an inkjet printer having a head for ejecting ink from nozzles as a recording device, but also to an electrophotographic printer having a laser-type recording device that forms an electrostatic latent image by exposing a photoreceptor with a laser beam, or an LED-type recording device that forms an electrostatic latent image by exposing a photoreceptor with an LED. Further, the sheet-shaped medium is not limited to paper, and may be cloth or a resin material such as a film as long as it is in the form of a sheet.

What is claimed is:

1. An image recording apparatus comprising:
   a feed tray configured to accommodate a sheet-shaped medium, the sheet-shaped medium including at least one of a first sheet-shaped medium or a second sheet-shaped medium; and
   a recording device configured to record an image on the sheet-shaped medium fed from the feed tray,
   wherein the feed tray comprises:
   a first media accommodation space configured to accommodate a roll, in which the first sheet-shaped medium is rolled in a roll shape;
   a second media accommodation space configured to accommodate a plurality of the second sheet-shaped media in a stacked state; and
   a display portion that displays setting information on setting of the sheet-shaped medium.

2. The image recording apparatus according to claim 1, wherein the display portion is provided on an upper portion of a member of the first media accommodation space.

3. The image recording apparatus according to claim 2, further comprising:
   a housing,
   wherein the feed tray is movable between an inner position where the feed tray is attached to the housing and an outer position where the feed tray is positioned outside the housing relative to the inner position,
   wherein the first media accommodation space and the second media accommodation space are aligned along a drawing direction of the feed tray from the inner position to the outer position, and
   wherein the first media accommodation space is located downstream of the second media accommodation space in the drawing direction.

4. The image recording apparatus according to claim 3, wherein the display portion is provided at a position shifted from a center position of the second media accommodation space in a width direction, the width direction being a horizontal direction that is perpendicular to the drawing direction.

5. The image recording apparatus according to claim 4,
   wherein the display portion protrudes from the upper portion of the member of the first media accommodation space toward the second media accommodation space, and
   wherein a protruding portion is formed at an end portion of the display portion on a side closer to the center position, amount of protrusion of the protruding portion toward the center position in the width direction gradually increasing from an upper end to a lower end.

6. The image recording apparatus according to claim 3,
   wherein the display portion has a display surface that displays the setting information, and
   wherein the display surface is inclined such that an upstream end portion in the drawing direction is positioned higher than a downstream end portion in the drawing direction.

7. The image recording apparatus according to claim 6,
   wherein the display portion has a label that displays the setting information, and
   wherein the label is stuck to the display surface.

8. The image recording apparatus according to claim 1,
   wherein the second media accommodation space comprises a support plate provided with a support surface for supporting the accommodated sheet-shaped medium,
   wherein the display portion comprises:
   a first display portion that displays information indicating that the second sheet-shaped medium is not accommodated in the second media accommodation space in a case the roll is to be fed; and
   a second display portion that displays information on a procedure for accommodating the roll in the first media accommodation space, unrolling the roll, and setting the first sheet-shaped medium, wherein the first display portion is provided on an upper portion of a member that forms the first media accommodation space, and wherein the second display portion is provided on the support surface.

9. The image recording apparatus according to claim 1, further comprising:
a housing,
wherein the feed tray is movable between an inner position where the feed tray is attached to the housing and an outer position where the feed tray is positioned outside the housing relative to the inner position,
wherein the first media accommodation space and the second media accommodation space are aligned along a drawing direction of the feed tray from the inner position to the outer position,
wherein the second media accommodation space comprises a support plate, the support plate being configured to support the accommodated second sheet-shaped medium,
wherein a lower surface of the support plate defines a passing path for the first sheet-shaped medium unrolled from the roll accommodated in the first media accommodation space, and
wherein the support plate has a portion, a length of said portion in an axial direction of the roll being shorter than a length of the roll in the axial direction of the roll.

10. The image recording apparatus according to claim 1,
wherein the second media accommodation space comprises a support plate having a support surface, the support surface being configured to support the accommodated sheet-shaped medium,
wherein the display portion has a display surface that displays the setting information, and
wherein the display surface is provided on the support surface.

11. The image recording apparatus according to claim 10,
wherein the display portion has a label that displays the setting information, and
wherein the label is stuck to the display surface.

12. The image recording apparatus according to claim 1, wherein the display portion is configured to display information on a setting procedure including at least one of: information on a procedure for accommodating the roll in the first media accommodation space unrolling the roll, and setting the first sheet-shaped medium; or information on a procedure for accommodating and setting the second sheet-shaped medium in the second media accommodation space.

13. The image recording apparatus according to claim 1, further comprising:
a feed roller configured to selectively feed either the first sheet-shaped medium unrolled from the roll accommodated in the first media accommodation space or the second sheet-shaped medium accommodated in the second media accommodation space,
wherein the display portion displays information indicating that the sheet-shaped medium is accommodated in only one of the first media accommodation space and the second media accommodation space.

14. The image recording apparatus according to claim 13, wherein the display portion is configured to display information indicating that the second sheet-shaped medium is not accommodated in the second media accommodation space when the first sheet-shaped medium unrolled from the roll is fed.

15. A feed tray configured to accommodate a sheet-shaped medium, the sheet-shaped medium including at least one of a first sheet-shaped medium or a second sheet-shaped medium, the feed tray comprising:
a first media accommodation space configured to accommodate a roll, in which the first sheet-shaped medium is rolled in a roll shape;
a second media accommodation space configured to accommodate a plurality of the second sheet-shaped media in a stacked state; and
a display portion that displays setting information on setting of the sheet-shaped medium.

16. The feed tray according to claim 15, wherein the display portion is provided on an upper portion of a member of the first media accommodation space.

17. The feed tray according to claim 15,
wherein the second media accommodation space comprises a support plate having a support surface, the support surface being configured to support the accommodated sheet-shaped medium,
wherein the display portion has a display surface that displays the setting information, and
wherein the display surface is provided on the support surface.

18. The feed tray according to claim 15, wherein the display portion is configured to display information on a setting procedure including at least one of: information on a procedure for accommodating the roll in the first media accommodation space, unrolling the roll, and setting the first sheet-shaped medium; or information on a procedure for accommodating and setting the second sheet-shaped medium in the second media accommodation space.

19. The feed tray according to claim 15,
wherein the second media accommodation space comprises a support plate provided with a support surface for supporting the accommodated sheet-shaped medium,
wherein the display portion comprises:
a first display portion that displays information indicating that the second sheet-shaped medium is not accommodated in the second media accommodation space in a case the roll is to be fed; and
a second display portion that displays information on a procedure for accommodating the roll in the first media accommodation space, unrolling the roll, and setting the first sheet-shaped medium,
wherein the first display portion is provided on an upper portion of a member that forms the first media accommodation space, and
wherein the second display portion is provided on the support surface.

20. The feed tray according to claim 15,
wherein the first media accommodation space and the second media accommodation space are aligned along a first direction, the first direction being perpendicular to an axial direction of the roll,
wherein the second media accommodation space comprises a support plate, the support plate being configured to support the accommodated second sheet-shaped medium,
wherein a lower surface of the support plate is configured to guide the first sheet-shaped medium unrolled from the roll accommodated in the first media accommodation space, and
wherein the support plate has a portion, a length of said portion in the axial direction of the roll being shorter than a length of the roll in the axial direction of the roll.

* * * * *